US008831625B2

(12) United States Patent
Joslyn et al.

(10) Patent No.: US 8,831,625 B2
(45) Date of Patent: Sep. 9, 2014

(54) SYSTEMS AND METHODS FOR PROCESSING SPECTRUM COEXISTENCE INFORMATION TO OPTIMIZE SPECTRUM ALLOCATION

(75) Inventors: Don Joslyn, DeBary, FL (US); Mario A. Camchong, Oviedo, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 148 days.

(21) Appl. No.: 13/557,511

(22) Filed: Jul. 25, 2012

(65) Prior Publication Data
US 2013/0035108 A1 Feb. 7, 2013

Related U.S. Application Data

(60) Provisional application No. 61/514,593, filed on Aug. 3, 2011.

(51) Int. Cl.
*H04W 72/04* (2009.01)
*H04W 24/08* (2009.01)
*H04W 16/14* (2009.01)

(52) U.S. Cl.
CPC .............. *H04W 24/08* (2013.01); *H04W 16/14* (2013.01)
USPC .......................... 455/454; 370/252; 455/452.1

(58) Field of Classification Search
USPC ........ 455/405, 414.1–414.3, 422.1, 423, 454, 455/452.1; 370/252–260, 330; 375/252–267
See application file for complete search history.

(56) References Cited

U.S. PATENT DOCUMENTS

| 5,608,727 | A | 3/1997 | Perreault et al. |
| 6,954,171 | B2 | 10/2005 | Husted et al. |
| 7,088,997 | B1 | 8/2006 | Boehmke |
| 7,110,756 | B2 | 9/2006 | Diener |
| 7,349,880 | B1 | 3/2008 | Kitao |
| 7,460,837 | B2 | 12/2008 | Diener |
| 7,782,964 | B1 | 8/2010 | Talley et al. |
| 2003/0032399 | A1 | 2/2003 | Slupe |
| 2004/0028003 | A1 | 2/2004 | Diener et al. |
| 2004/0087310 | A1 | 5/2004 | Williamson et al. |
| 2005/0128971 | A1 | 6/2005 | Huschke et al. |
| 2006/0031082 | A1 | 2/2006 | Amaitis et al. |
| 2006/0083205 | A1 | 4/2006 | Buddhikot et al. |

(Continued)

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

(Continued)

*Primary Examiner* — Kashif Siddiqui
(74) *Attorney, Agent, or Firm* — Renner, Otto, Boisselle & Sklar, LLP.

(57) ABSTRACT

A coexistence data provider in a system for allocating spectrum to spectrum user devices includes an interface configured to receive inputs of available spectrum information, and to receive a plurality of device coexistence data reports that pertain to spectrum usage of the spectrum user devices. A controller is configured to execute a coexistence data application that is stored in a memory and, by execution of the coexistence data application, the coexistence data provider is configured to combine the available spectrum information and the device coexistence data reports to generate a network coexistence report that is indicative of spectrum usage within the one or more networks. Based on the network coexistence report, the coexistence data provider offers spectrum that provides enhanced user device performance. Spectrum user devices also can receive and analyze the network coexistence report, and retune to spectrum that provides enhanced user device performance.

18 Claims, 8 Drawing Sheets

(56) References Cited

U.S. PATENT DOCUMENTS

| | | |
|---|---|---|
| 2006/0143111 A1 | 6/2006 | Mylet |
| 2006/0182169 A1 | 8/2006 | Belge et al. |
| 2006/0218392 A1 | 9/2006 | Johnston |
| 2006/0234713 A1 | 10/2006 | Oswal et al. |
| 2006/0262768 A1 | 11/2006 | Putzolu |
| 2007/0106596 A1 | 5/2007 | Bayyapu et al. |
| 2007/0274404 A1 | 11/2007 | Papandriopoulos et al. |
| 2007/0281710 A1 | 12/2007 | Bai et al. |
| 2008/0052387 A1 | 2/2008 | Heinz et al. |
| 2008/0108365 A1 | 5/2008 | Buddhikot et al. |
| 2008/0112361 A1 | 5/2008 | Wu |
| 2008/0151743 A1 | 6/2008 | Tong et al. |
| 2008/0183634 A1 | 7/2008 | Sadler |
| 2008/0186882 A1 | 8/2008 | Scherzer et al. |
| 2008/0221951 A1 | 9/2008 | Stanforth et al. |
| 2008/0222019 A1 | 9/2008 | Stanforth et al. |
| 2008/0222021 A1 | 9/2008 | Stanforth et al. |
| 2008/0279147 A1 | 11/2008 | Hassan et al. |
| 2009/0046625 A1 | 2/2009 | Diener et al. |
| 2009/0197627 A1 | 8/2009 | Kuffner et al. |
| 2011/0074387 A1 | 3/2011 | Zhuang |
| 2011/0075586 A1 | 3/2011 | Hu et al. |

OTHER PUBLICATIONS

By the Commission, "Second Report and Order, Order on Reconsideration, and Second Further Notice of Proposed Rulemaking", Federal Communications Commission, 2004, FCC 04-167, pp. 1-180.

Prabhu, Krish et al., "Time for Action" Genuine Ideas, 2002, [retrieved online Feb. 1, 2008], <http://www.genuineideas.com/ArticlesIndex/TimeForAction.htm>.

U.S. Spectrum Management Policy: Agenda for the Future, 1991.

Radio Spectrum Management, Module 5 of ICT Regulation Toolkit, ITU, 2007.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

International Search Report and Written Opinion dated Oct. 19, 2012 for corresponding application No. PCT/US20012/048267.

SYSTEMS AND METHODS FOR PROCESSING SPECTRUM COEXISTENCE INFORMATION TO OPTIMIZE SPECTRUM ALLOCATION

RELATED APPLICATION DATA

The present application claims the benefit of U.S. Provisional Application Ser. Nos. 61/514,593, which was filed on Aug. 3, 2011, the disclosure of which is herein incorporated by reference in its entirety.

TECHNICAL FIELD OF THE INVENTION

The technology of the present disclosure relates generally to spectrum management, and more particularly, to systems and methods for collecting and centrally processing spectrum coexistence information to optimize spectrum allocation among spectrum user devices.

BACKGROUND

Wireless networks and systems are becoming increasingly popular. Wireless communications, however, are constrained due to a limited amount of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties. An entity that seeks to transfer spectrum in the secondary market commonly is referred to as a "spectrum provider" or a "spectrum holder," and an entity or wireless communications system or device that has a need for spectrum to carry out wireless communications commonly is referred to as a "spectrum user." A spectrum provider or holder also may be a spectrum user.

In the U.S., some spectrum may be used without a license, but regulations on the spectrum may be imposed. For example, the FCC has implemented the elimination of analog television (TV) broadcasts in favor of digital TV broadcasts. This has freed up spectrum channels for use by unlicensed radio systems to offer various services, such as mobile communications and Internet access. This freed spectrum is commonly referred to as TV whitespace (TVWS), which is made up of the guard bands and unused TV channels between channel 2 and channel 51 (corresponding to 54 MHz to 698 MHz).

To avoid interference with digital TV broadcasts and other incumbent systems, such as wireless microphone systems, radios that use the TV whitespace are required to register and receive a channel map of available channels that may be used for the communications activity of the radio system. Current regulations require these radio systems to register every twenty-four hours. Also, for mobile radios, if the radio moves into a new location, a new registration is required. Other regulations on the radios are present, such as transmitted power limits for different types of radios. Additional information regarding the regulation of TV whitespace may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

Conventional wireless networks use radios that transmit or receive communications within a fixed channel set or band. In some circumstances, radios are permitted to search among a predefined set of channels in a programmed way, as in trunked radio or cellular networks. The pool of available spectrum, however, is typically finite (or static), and radio channels and bandwidth are not optimized on an individual user or application basis. This leads to high inefficiencies in spectrum utilization, and since spectrum is a scarce resource, less than optimal performance for the user and network as a whole can occur.

To allocate spectrum efficiently and on a non-interfering basis, spectrum should be described in terms that render spectrum tantamount to a fungible asset. In this manner, "chunks" or "portions" of spectrum can be used, transferred, and otherwise manipulated as a commoditized object or entity. Conventionally, spectrum has been allocated principally in terms of area, time, and frequency. FIG. 1 is a schematic graph of blocks of conventional spectrum use rights that may be transferred from a corresponding spectrum holder to a spectrum user. The components that identify a block of spectrum include a time window, a frequency-based spectral mask, a geographic coverage area, and/or a transmitted power limit, which may be combined to form a spectrum commodity object 10. The graph of FIG. 1 schematically illustrates blocks of spectrum in three dimensions, including time, space (or geographic coverage area) and frequency. Each spectrum commodity object 10 also may have the associated transmitted power limit, which is a power value that radios operating in accordance with the transmitted power limit may not exceed. Each spectrum commodity object 10 may be associated with use rights that may be transferred from a corresponding spectrum holder to a spectrum user in the secondary market. The spectrum commodity object may have an associated monetary or non-monetary value, or may not be associated with a value.

In today's advanced wireless networks, cognitive radios are available that have the capability to dynamically tune to different frequencies. Even when radios have such capabilities, however, in most cases these wireless radios still are initially configured to use a specific frequency that is available at the time of such initial configuration. Accordingly, a cognitive radio, although as a technical matter may be capable of using many different frequencies, is still being statically configured to use a specific frequency. The radio, therefore, typically will utilize the specific frequency of the initial configuration regardless of future conditions that might negatively affect performance while using the statically assigned frequency, and regardless of the technical capability of dynamically changing to a different frequency that may offer better performance. The reason for statically configuring otherwise cognitive radios in this manner is mostly due to the fact that a single device in a network does not have enough information about network-wide spectrum allocation to make a dynamic decision to move to a different frequency that may offer better performance without creating interference issues with other user devices. Thus, while a spectrum user device as a technical matter may be able to determine that the currently configured spectrum is not offering satisfactory performance, the device essentially would not know what other spectrum is currently available, or how many devices are already using the other available spectrum so as to avoid interference issues. To determine spectrum that would offer enhanced performance, a cognitive radio would need to "know" how the spectrum is being allocated and used by other devices in or near the coverage area of the user device.

Some spectrum user devices have a sensing capability. In particular, such sensing devices may attempt to sense congestion and interference at a frequency of usage. If performance due to congestion and interference deteriorates below an acceptable level, the sensing user device may attempt to determine a more suitable frequency that offers improved performance, and then retune to a more suitable frequency if one can be identified. This device-based sensing capability, however, often proves incomplete and deficient. Sensing devices typically lack the full capability to perform sufficient detection and analysis of all usages by potentially interfering devices in or near the pertinent coverage area. Accordingly, even the operation of a sensing device will not ensure adequate performance because device sensing capabilities are limited. In addition, sensing devices conventionally do not share sensed information with other sensing devices. In this regard, difference devices or categories of usage may employ different formats and metrics for processing sensing data, and therefore the sharing of sensing information among spectrum user devices is substantially limited.

Furthermore, not all spectrum user devices possess even a limited sensing capability. Non-sensing devices, therefore, are unable to determine a more suitable frequency of operation to overcome congestion and interference issues.

In view of the above deficiencies of conventional networks, cognitive radio capabilities are not being utilized to their full potential, insofar as cognitive radios conventionally have been configured to operate only at a specific frequency (or limited frequencies) set by an initial configuration, and lack full sensing capabilities to determine spectrum usage among the various user devices within a pertinent coverage area.

SUMMARY

There is a need in the art for an improved system and methods for allocating spectrum to cognitive radios in a manner that utilizes the capabilities of such radios to dynamically tune to difference frequencies of operation. To achieve such results, the described systems and methods collect and centrally process spectrum coexistence information, which can that be utilized by either the spectrum providers or user devices to optimize spectrum allocation among cognitive spectrum user devices.

The described systems and methods utilize a central database service in the form of a coexistence data provider that obtains and processes device coexistence data reports from spectrum user devices that are indicative of device spectrum usage. The coexistence data provider can combine the device coexistence data reports of a multitude of spectrum user devices with available spectrum information to generate a network coexistence report that provides a detailed picture of spectrum usage across one or more wireless communication networks. Spectrum providers may use the network coexistence report to generate offerings to user devices of spectrum that would provide enhanced performance. The network coexistence report also can be used by a cognitive radio or other spectrum user device to dynamically select a frequency of spectrum in which to operate that offers the best performance available. Network coexistence reports thus can be received by spectrum user devices, which then may use such reports to select a more suitable spectrum for usage. Depending on permitted spectrum usage parameters, spectrum user devices may either retune to more suitable spectrum, or if immediate retuning is not permitted under the usage parameters, may generate a request for spectrum usage that is transmitted to the spectrum provider. The spectrum provider can then generate an offering of the suitable spectrum in response to the request for spectrum.

The described system and devices for processing coexistence information may be implemented as a computer-based system that stores software (programs, code, and/or logical instructions) and data on a computer readable medium (e.g., a memory), and executes such software with one or more electronic control devices or processor devices. In particular, a coexistence data provider component of an authorized shared access (ASA) system (also referred to as a universal spectrum access system or USA system) provides a cloud-based service that uses a database to receive, store, and process coexistence data reports received from spectrum user devices in one or more networks. The received data combined with spectrum availability data can be combined into a standardized network coexistence report that provides a larger, detailed view of spectrum usage activity within one or more networks, that may be employed by the spectrum user devices to dynamically select a frequency of spectrum in which to operate that offers the best performance available.

Therefore, an aspect of the invention is a coexistence data provider in a system for allocating spectrum to spectrum user devices within one or more wireless communication networks. In exemplary embodiments, the coexistence data provider includes an interface configured to receive inputs of available spectrum information, and to receive a plurality of device coexistence data reports from a respective plurality of spectrum user devices, wherein the plurality of device coexistence data reports pertain to spectrum usage of the respective plurality of spectrum user devices. A controller is configured to execute a coexistence data application that is stored in a memory and, by execution of the coexistence data application, the coexistence data provider is configured to combine the available spectrum information and the device coexistence data reports to generate a network coexistence report that is indicative of spectrum usage within the one or more networks. A database stores the network coexistence report.

In an exemplary embodiment of the coexistence data provider, the coexistence data provider further includes a data store that stores the available spectrum information.

In an exemplary embodiment of the coexistence data provider, the coexistence data provider further includes a data store that stores the device coexistence data reports.

In an exemplary embodiment of the coexistence data provider, by the controller execution of the coexistence data application, the coexistence data provider is configured to generate a plurality of coexistence metrics that constitute measures of performance efficiency of the spectrum user devices, and the network coexistence report includes the coexistence metrics.

In an exemplary embodiment of the coexistence data provider, the coexistence metrics include a moving average of packet complete rate values for the spectrum being utilized by the spectrum user devices.

In an exemplary embodiment of the coexistence data provider, by the controller execution of the coexistence data application, the coexistence data provider is configured to identify performance issues that are indicative of underperformance of at least one of the spectrum user devices, determine suitable spectrum that provides enhanced performance for the at least one of the spectrum user devices, and incorporate the determined suitable spectrum into the network coexistence report.

In an exemplary embodiment of the coexistence data provider, by the controller execution of the coexistence data application, the coexistence data provider is configured to generate a spectrum offering of the determined suitable spectrum, and transmit the offering of the determined suitable spectrum via the interface to the at least one of the spectrum user devices.

In an exemplary embodiment of the coexistence data provider, the coexistence data provider receives a confirmation of acceptance of the spectrum offering via the interface from the at least one of the spectrum user device.

In an exemplary embodiment of the coexistence data provider, the coexistence data provider transmits the network coexistence report via the coexistence interface to the at least one of the spectrum user devices.

In an exemplary embodiment of the coexistence data provider, the coexistence data provider transmits the network coexistence report via the coexistence interface to the plurality of the spectrum user devices.

Another aspect of the invention is a method of processing coexistence data by a coexistence data provider. In exemplary embodiments, the method of processing coexistence data includes the steps of receiving available spectrum information over an interface, receiving device coexistence data reports from a plurality of spectrum user devices regarding the spectrum usage of the plurality of spectrum user devices, executing a spectrum provisioning application that is stored in a memory and, by executing the spectrum provisioning application, combining the available spectrum information and the device coexistence data reports to generate a network coexistence report that is indicative of spectrum usage within one or more wireless communication networks, and storing the network coexistence report in a database.

In an exemplary embodiment of the method processing coexistence data, the method further includes storing the available spectrum information in a data store.

In an exemplary embodiment of the method processing coexistence data, the method includes storing the device coexistence data reports in a data store.

In an exemplary embodiment of the method processing coexistence data, the method further includes executing the coexistence data application to generate a plurality of coexistence metrics that constitute measures of performance efficiency of the spectrum user devices, and the network coexistence report includes the coexistence metrics.

In an exemplary embodiment of the method processing coexistence data, the coexistence metrics include a moving average of packet complete rate values for the spectrum being utilized by the spectrum user devices.

In an exemplary embodiment of the method processing coexistence data, the method further includes executing the coexistence data application to perform the steps of identifying performance issues that are indicative of underperformance of at least one of the spectrum user devices, determining suitable spectrum that provides enhanced performance for the at least one of the spectrum user devices, and incorporating the determined suitable spectrum into the network coexistence report.

In an exemplary embodiment of the method processing coexistence data, the method further includes executing the coexistence data application to perform the steps of generating a spectrum offering of the determined suitable spectrum, and transmitting the offering of the determined suitable spectrum via the interface to the at least one of the spectrum user devices.

In an exemplary embodiment of the method processing coexistence data, the method further includes receiving a confirmation of acceptance of the spectrum offering via the interface from the at least one of the spectrum user devices.

In an exemplary embodiment of the method processing coexistence data, the method further includes transmitting the network coexistence report via the coexistence interface to the at least one of the spectrum user devices.

In an exemplary embodiment of the method processing coexistence data, the method further includes transmitting the network coexistence report via the interface to the plurality of the spectrum user devices.

Another aspect of the invention is a first spectrum user device. In exemplary embodiments, the first spectrum user device includes a coexistence data generator that generates a device coexistence data report, wherein the device coexistence data report pertains to spectrum usage of the spectrum user device. A memory stores the device coexistence data report, and a communication interface transmits the device coexistence data report to a coexistence data provider.

In an exemplary embodiment of the first spectrum user device, the device coexistence data report is combinable with available spectrum information by the coexistence data provider to generate a network coexistence report that is indicative of spectrum usage within one or more wireless communication networks.

In an exemplary embodiment of the first spectrum user device, the device coexistence data report includes device identifying information and at least one of the spectrum user device's, location, coverage area of any current spectrum usage, current spectrum usage frequency, power spectral density, packet completion rate, duty cycle, or sensing data.

Another aspect of the invention is a second spectrum user device. In exemplary embodiments, the second spectrum user device includes an interface that receives a network coexistence report from a coexistence data provider, wherein the network coexistence report is indicative of spectrum usage within one or more wireless communication networks. A controller is configured to execute a spectrum selection application that is stored in a memory and, by execution of the spectrum selection application, the controller is configured to analyze the network coexistence report to determine any performance issues that are associated with current spectrum usage, and identify suitable spectrum that provides enhanced performance. The second spectrum user device further includes a tuner, wherein the second spectrum user device retunes to the identified suitable spectrum.

In an exemplary embodiment of the second spectrum user device, the second spectrum user device further includes a spectrum request generator that generates a request for spectrum corresponding to the identified suitable spectrum. The spectrum request is transmitted via the interface to the coexistence data provider, and an offering of spectrum is received via the interface from the coexistence data provider in response to the request. The spectrum user device retunes to the identified suitable spectrum in response to the offering of spectrum.

In an exemplary embodiment of the second spectrum user device, the spectrum request generator generates a confirmation of acceptance of the offering of spectrum, and the confirmation is transmitted via the interface to the coexistence data provider.

Another aspect of the invention is a method of selecting spectrum by a spectrum user device. In exemplary embodiments, the method of selecting spectrum includes the steps of receiving a network coexistence report via an interface from a coexistence data provider, wherein the network coexistence report is indicative of spectrum usage within one or more wireless communication networks, executing a spectrum selection application that is stored in a memory to analyze the network coexistence report to determine any performance issues that are associated with current spectrum usage, and identify suitable spectrum that provides enhanced performance, and retuning to the identified suitable spectrum.

In an exemplary embodiment of the method of selecting spectrum, the method further includes the steps of generating a request for spectrum corresponding to the identified suitable spectrum, transmitting the spectrum request via the interface to the coexistence data provider, receiving an offering of spectrum via the interface from the coexistence data provider in response to the request, and retuning to the identified suitable spectrum in response to the offering of spectrum.

In an exemplary embodiment of the method of selecting spectrum, the method further includes the steps of generating a confirmation of acceptance of the offering of spectrum, and transmitting the confirmation via the interface to the coexistence data provider.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
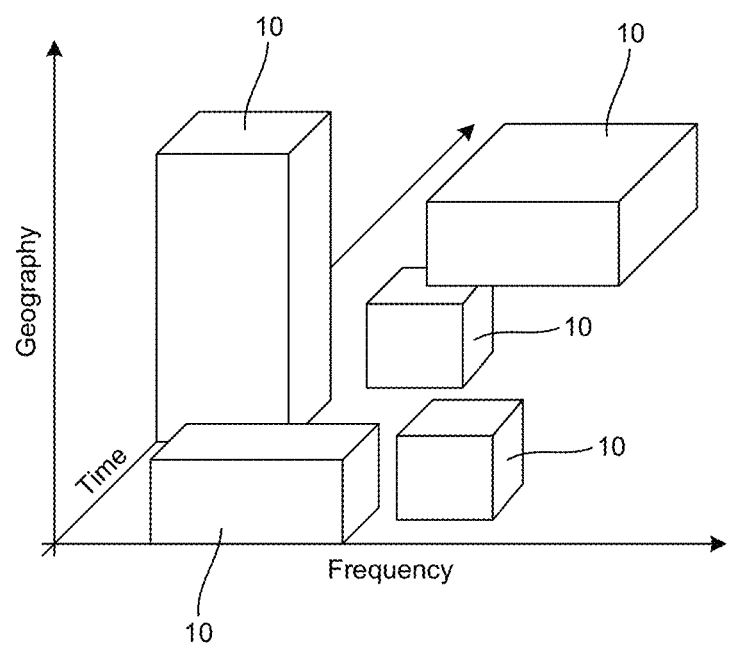
FIG. 1 is a schematic graph of blocks of spectrum use rights that may be transferred from a corresponding spectrum holder to a spectrum user.

Embodiments will now be described with reference to the drawings, wherein like reference numerals are used to refer to like elements throughout. It will be understood that the figures are not necessarily to scale.

It will be appreciated that aspects of the disclosed systems and methods are independent of the type or types of cognitive radio devices that may use spectrum. As such, the systems and methods may be applied in any operational context for wireless communications, and wireless communications are expressly intended to encompass unidirectional signal transmissions (e.g., broadcasting of a signal for receipt by a device without response), and to encompass bidirectional communications where devices engage in the exchange of signals. The systems and methods may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable wireless communications environment.

Figure 2:
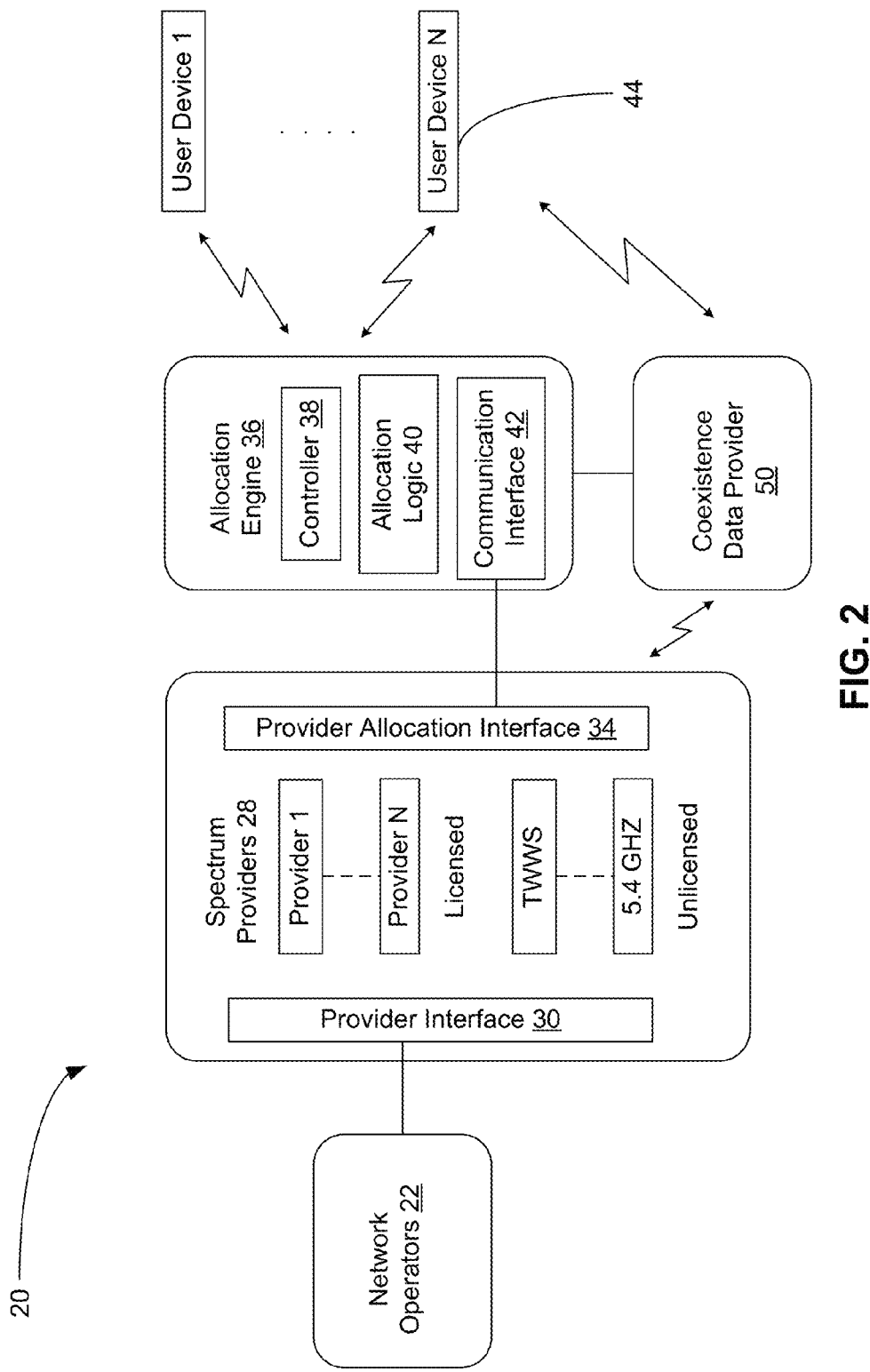
FIG. 2 is a schematic diagram that depicts operative portions of an exemplary authorized shared access (ASA) system.

FIG. 2 is a schematic diagram that depicts operative portions of an exemplary authorized shared access (ASA) system 20. The system includes one or more network operators 22. Generally, the network operators are entities that are spectrum holders that utilize the ASA system to offer spectrum, and typically may be large telecommunications companies that offer wireless networking services (e.g., AT&T, Verizon, and the like). The network operators can enter available spectrum into the ASA system for purposes of provisioning the available spectrum for spectrum providers, the provisioned spectrum then being allocated to end user devices as further explained below. Generally, the network operators provision spectrum by identifying a set of provisioning parameters and rules, which are used by the system during spectrum allocation such that the end user devices comply with the spectrum provisioning parameters.

The ASA system 20 further includes a plurality of spectrum providers 28. The spectrum providers 28 may obtain information regarding available spectrum via a provider interface 30. The spectrum providers in turn offer spectrum to end user devices through an allocation engine 36. The spectrum providers may be categorized based on the type of spectrum being provided or offered, although it will be appreciated that a given spectrum provider may provide multiple categories of spectrum. Broadly speaking, spectrum may be classified into three general categories of available spectrum. "Unlicensed spectrum," also referred to as "license-free spectrum," is spectrum for which spectrum users do not have to apply and pay a license fee to use this spectrum as long as it satisfies regulatory rules and requirements concerning spectrum use. TV white space and 2.4 GHz spectrum for WiFi are examples of spectrum that would fall within the category of unlicensed spectrum. Some countries, however, may require registration of each specific radio or link that uses the unlicensed spectrum.

"Licensed spectrum" includes bands of spectrum that are reserved for a specific use, or sold or leased to a specific spectrum user. For example, a governmental entity may reserve spectrum for military or public safety use, or may grant exclusive spectrum licensees to Commission licensees. The license grants the licensee an exclusive use of that spectrum for a specific use, thereby eliminating any interference issues with the parameters of the license. If a licensee subleases its spectrum to other entities in the secondary market, the licensee can set additional rules and requirements for the spectrum use within the original license.

"Licensed-exempt spectrum," which is also referred to as "lightly-licensed spectrum," such as the 3.65 GHz band in the U.S., is a hybrid of the other two types. A user or entity must register with the FCC and pay a nominal fee before using any equipment operating in the lightly-licensed band. Although registration is required, there is no grant of an exclusive right to use that frequency in any particular location. Spectrum uses among the various user devices must be considered to mitigate any potential interference issues. In addition, an entity might have to pay additional nominal fees for each high powered based station the spectrum user deploys.

The spectrum providers may include a provider allocation interface 34. The provider allocation interface 34 provides a link to the provisioned spectrum information by an allocation engine 36, as depicted in FIG. 2. The allocation engine 36, therefore, has a cooperating communication interface 42. This communication interface 42 is used by allocation engine 36 to gather available spectrum information from the providers. The allocation engine can query more than one provider (e.g. TVWS, licensed) before making a spectrum offer to a spectrum user device. Interaction between provider entities and the allocation engine is through electronic software calls as are known in the art.

As depicted in FIG. 2, allocation engine 36 includes a controller 38 that executes allocation logic 40. The allocation engine can receive a spectrum request from a spectrum user device 44 via the communication interface 42. After verifying device credentials, the allocation engine queries one or more spectrum providers and runs the allocation logic 40 to identify appropriate spectrum based on the response received from providers. The allocation engine in turn transmits an offer of spectrum to a user device 44. In other words, the communication interface 42 provides an interface over which a user device 44 may submit a request for wireless spectrum usage, and the allocation engine may transmit a spectrum allocation response to the request. It will be appreciated, therefore, that the allocation engine can generate offerings of spectrum based on the information obtained from the providers as to spectrum availability, and/or may generate an offering of such available spectrum in response to a spectrum request for spectrum by a user device. Interaction between the allocation engine 36 and user devices 44 typically is via electronic messaging as in known in the art.

As referred to herein the spectrum user device 44, or simply device, is the end user of ASA system. Thus, the terms "spectrum user" and "device" or "user device" are used interchangeably. The user device sends spectrum requests to the ASA system including its capability and usage interests, which are then used by the allocation engine to make an offer of spectrum usage within the available spectrum of the provider(s). The ASA system described herein may operate in conjunction with any suitable user devices. Each user device 44 may generate a report of coexistence data that may be employed to enhance the allocation of spectrum, as further detailed below.

As further depicted in FIG. 2, the ASA system includes a coexistence data provider 50. Generally, the coexistence data provider 50 is a cloud-based service that uses a database configuration to receive, store, and process coexistence data reports received from the spectrum user devices 44 in one or more networks. The received device coexistence data can be combined with available spectrum information into a network coexistence report that provides a larger, detailed view of spectrum usage activity within one or more networks as compared with sensing data that otherwise can be detected by a single spectrum user device. Accordingly, the coexistence data provider 50 is a centralized entity that collects coexistence data from dissimilar devices over one or more wireless communication networks. Combined with the available spectrum information, the coexistence data provider generates a standardized network coexistence report, which in turn can be shared and distributed back to the varied user devices. The coexistence data provider, therefore, operates to collect, combine, standardize, and redistribute collective coexistence sensing data among a multitude of user devices, thereby enhancing the devices' ability to employ such sensing data in selecting suitable spectrum.

Although FIG. 2 depicts the coexistence data provider 50 as being a separate component of the ASA system, it will be appreciated that other configurations may be employed. For example, the coexistence data provider 50 may be employed as a component of the allocation engine 36, with the operations of the coexistence data provider being executed as part of the execution of the allocation logic 40.

Accordingly, a coexistence data provider 50 is provided in a system for allocating spectrum to spectrum user devices within one or more wireless communication networks. The coexistence data provider includes an interface configured to receive inputs of available spectrum information from spectrum providers, and to receive a plurality of device coexistence data reports from a respective plurality of spectrum user devices. The plurality of device coexistence data reports pertain to spectrum usage of the respective plurality of spectrum user devices, and may include sensing data that is sensed by the respective spectrum user devices. A controller is configured to execute a coexistence data application that is stored in a memory and, by execution of the coexistence data application, the coexistence data provider is configured to combine the available spectrum information and the device coexistence data reports to generate a network coexistence report that is indicative of spectrum usage within the one or more networks. A database may store the network coexistence report.

Figure 3:
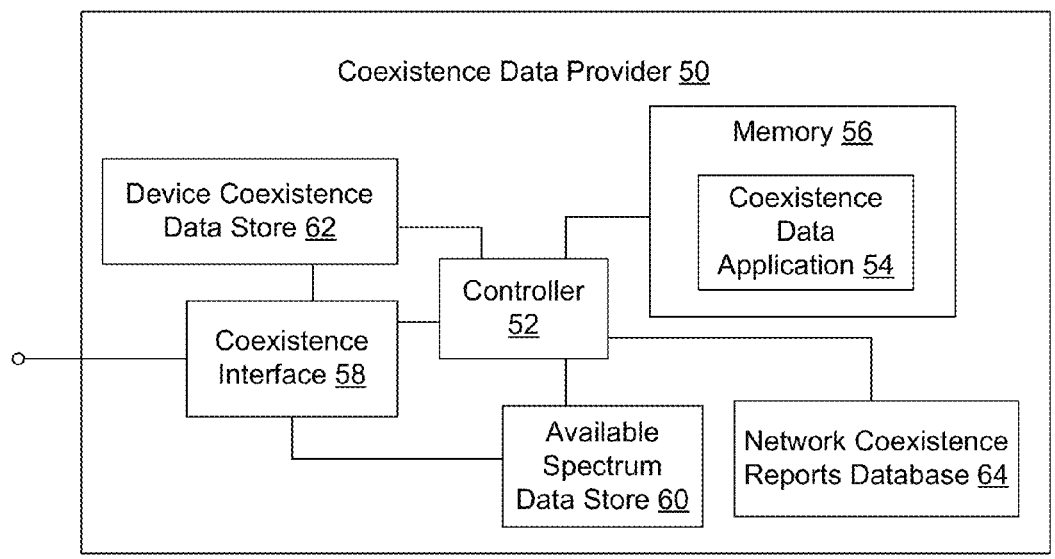
FIG. 3 is a schematic block diagram that depicts operative portions of an exemplary the coexistence data provider.

FIG. 3 is a schematic block diagram that depicts the operative portions of an exemplary coexistence data provider 50. The coexistence data provider 50 may operate as a computer-based system capable of executing computer applications (e.g., software programs). The coexistence data provider 50 may include a controller or control circuit 52 that is configured to execute a coexistence data application 54. The term "control circuit" or "controller" refers to any structural arrangement that implements a stated control function, and may include dedicated circuit components, firmware, and/or a processor that executes logical instructions. In exemplary embodiments, the coexistence data application 54 is embodied as one or more computer programs (e.g., one or more software applications including compilations of executable code). The computer program(s) may be stored on a computer or machine readable medium 56, such as a magnetic, optical or electronic storage device (e.g., hard disk, optical disk, flash memory, etc.).

To execute the coexistence data application 54, the controller 52 may include one or more processors used to execute instructions that carry out a specified logic routine(s). The computer readable medium 56, also referred to as a memory 56, may constitute a memory component for storing data, logic routine instructions, computer programs, files, operating system instructions, and the like. The memory 56 may comprise several devices, including volatile and non-volatile memory components. Accordingly, the memory 56 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The controller or control circuit 52 and the components of the memory 56 may be coupled over a local interface, bus, and/or data structure, as is conventional for a computer based system.

The coexistence data provider 50 further may include a coexistence interface 58. As further explained below, the coexistence interface 58 is configured as an electronic communications interface that receives communications containing information and data regarding: (1) available spectrum information pertaining to available spectrum that may be offered by the spectrum providers, and (2) device coexistence data reports from the spectrum user devices 44. In exemplary embodiments, the coexistence data provider may receive such communications through the allocation engine, or alternatively the coexistence date provider 50 may communicate directly with the spectrum providers 28 and/or spectrum user devices 44 over the network (see FIG. 2).

As depicted in the example of FIG. 3, available spectrum information may be stored within the coexistence data provider in an available spectrum data store 60. As referenced above, the available spectrum information may be received via the coexistence interface 58 automatically as the system recognizes that free spectrum has become available, or as a result of manual inputs by the spectrum providers. The available spectrum information includes spectrum that may be offered by the spectrum providers, as well as information regarding spectrum that has been previously allocated by the allocation engine. Similarly, communications including the device coexistence data reports may be received via the coexistence interface 58 and stored as coexistence data in a device coexistence data store 62. It will be appreciated that the configuration of the storage of information in databases may be varied to any suitable configuration. For example, although depicted as separate component databases in the example of FIG. 3, the databases in the form of data stores 60 and 62 may be incorporated into one or more of the memory devices that constitute the memory 56, or stored in databases that are remote from the coexistence data provider 50.

Generally, the controller 52 executes the coexistence data application 54, and in doing so initially reads the available spectrum information from the available spectrum data store 60, and reads device coexistence data from the device coexistence data store 62. The device coexistence data reports received from spectrum user devices include such parameters and information as, for example, each user device's identifying information, location and coverage area of any current spectrum usage, current spectrum usage frequency (frequency start and end), power spectral density (PSD), a performance metric such as a packet completion rate, a measurement mode such as whether the performance metric is sensed or derived, and various other PSD measurements from other frequencies for which the device is able to operate. The user devices also may report their expected communication duty cycle, which indicates the expected amount of traffic, expressed by low, medium, high or a value measured in Mbytes per minute or hour. If a given spectrum user device also is a sensing device, the device coexistence data report also may include sensing data that is detected by such given spectrum user device. Each device coexistence data report of a respective user device, therefore, provides detailed information as to spectrum usage of the respective user device.

As referenced above, the coexistence data provider has access to available spectrum information, which may include spectrum allocation information that defines the spectrum that has been allocated previously to user devices in the networks being monitored. The spectrum allocation and availability information is combined with the device coexistence data from the user devices, and processed by the controller to generate a detailed, overall picture of the current spectrum utilization in the network or networks being monitored.

The controller 52 of the coexistence data provider can then process this information by execution of the coexistence data application 54 to identify any performance issues that may be occurring within the network. In this manner, the coexistence data provider identifies devices in the network that are underperforming due to congestion or overuse of spectrum by too many devices in the network. In particular, the coexistence date provider is configured to generate a plurality of coexistence metrics that constitute measures of performance efficiency of the spectrum user devices. The communication or coexistence metrics are incorporated into a network coexistence report of spectrum usage within the network or networks being monitored. The network coexistence report thus presents a detailed picture and analysis of the current spectrum utilization in the network or networks being monitored among the various user devices. The network coexistence reports may be stored in a network coexistence reports database 64.

In exemplary embodiments, each user device in the network may continuously send device coexistence data reports to the coexistence data provider (stored in the coexistence data store 62) that include all sensed frequencies with corresponding power spectral density (PSD) values, as well as packet completion rate (PCR) values, for spectrum being used by the user device. The coexistence data provider determines a plurality of coexistence metrics that constitute measures of the performance efficiency of devices within the network, and such metrics are incorporated as part of the network coexistence reports. For example, the coexistence data provider can maintain a moving average for the PCR as a metric for the network performance. The moving average PCR is one of many indicators that can be incorporated into a network coexistence report and used to characterize the performance of local communication links using specific spectrum by the spectrum user devices.

Via the coexistence interface 58, the coexistence data provider tracks the allocation of spectrum by the ASA as the allocation engine allocates spectrum. In addition, the devices in the network continuously send device coexistence data reports to the coexistence data provider, from which the various coexistence metrics are determined to generate the network coexistence reports. The coexistence data provider can then proactively mitigate localized congestion by dynamically sending new spectrum availability information in the form of updated spectrum use offers via the coexistence interface 58 to user devices such that new suitable spectrum may be made available to user devices that would provide better performance than the spectrum currently being used by the user devices, thereby improving communication performance for the affected devices. As used herein, therefore, the term "suitable spectrum" is utilized to mean spectrum that provides better performance for a spectrum user device than the spectrum currently being used by the spectrum user device. Relatedly, as used herein an "offer" or "offering" of spectrum is any suggestion by the coexistence data provider that spectrum be made available to a spectrum user device for reallocation of usage. The user device need not necessarily explicitly respond to the offer to use the spectrum (but may respond in certain circumstances). In addition, an offer of spectrum need not require any exchange of value for the spectrum user to use the spectrum (but in certain circumstances an exchange of value may occur).

Accordingly, the coexistence data 50, by the controller execution of the coexistence data application 54 is configured to identify performance issues that are indicative of underperformance of at least one of the spectrum user devices, and determine suitable spectrum that provides enhanced performance for the at least one of the spectrum user devices. The determined suitable spectrum may then be incorporated into the network coexistence report. The coexistence data provider further is configured to generate a spectrum offering of the determined suitable spectrum, and transmit the offering of the determined suitable spectrum via the interface to the at least one of the spectrum user devices.

In particular, offers of suitable spectrum may be transmitted via the coexistence interface 58 directly to the user device(s), or alternatively through the allocation engine as part of the broader allocation of spectrum within the system. In other words, the allocation engine can be provided with the coexistence metrics and related updated spectrum offerings that are generated. The system can also operate in a reverse, device-initiated manner. For example, a user device that senses it is underperforming may generate a spectrum request for suitable spectrum in which enhanced performance can be achieved. The coexistence data provider can receive such requests via the coexistence interface 58, and then determine suitable spectrum that in turn may be incorporated into an updated spectrum offering that is generated in response to the request. Again, the offers of suitable spectrum may be transmitted via the coexistence interface 58 directly to the user device(s), or alternatively through the allocation engine.

The coexistence data provider may use received device coexistence data reports as a trigger to perform processing to generate the network coexistence reports (including historical coexistence reports that have been generated previously), combined with spectrum availability and allocation information. As referenced above, the coexistence data provider maintains various metrics of spectrum user device performance, such as, for example, a moving average for communication metrics such as a packet completion rate (PCR). The coexistence data provider thereby processes the device coexistence data from the spectrum user devices in the network, and is able to correlate reports from different devices based on device location and operating radius or current coverage area to generate the coexistence reports for the network. This processing and correlation allows the coexistence data provider to "see" or identify interference and congestion in the network that would be difficult for individual devices to see with simple device sensing. Using such correlated data, the coexistence data provider is also able to predict poor performance based on the number of devices using the same spectrum within a specific location radius, and the communication duty cycle specified by the devices indicating when the devices acquired spectrum.

When the coexistence data provider recognizes low packet completion rates, or predicts the potential for low packet completion rates based on overuse of specific spectrum within a specific coverage area, the coexistence data provider acts, on behalf of affected devices, to query the allocation engine for available spectrum that may be used by the affected devices. If the coexistence data provider is provided with available spectrum that can be used by the affected devices, the coexistence data provider sends a spectrum use offer to the affected device. The use offer may contain the network coexistence report that can be used by the user device to assist in a determination or selection as to whether to reconfigure so as to utilize the offered spectrum, or a portion of the offered spectrum. The spectrum offer may include multiple alternative prospective usages, from which the device may select. If the affected user device selects to reconfigure to utilize offered suitable spectrum, it will send an offer confirmation to the coexistence data provider via the coexistence interface 58, and the user device retunes to the selected suitable spectrum.

It will be appreciated, therefore, that the operations of the coexistence data provider improve over conventional, device-based sensing. By gathering the device coexistence data from a multitude of user devices, the combined coexistence data generated by the coexistence data provider is far more complete than any singular device could sense alone. Furthermore, the generated network coexistence report is provided in a standardized format that can be read by all user devices operating within the network(s) being monitored. In generating the network coexistence report, therefore, the coexistence data provider provides a sharing of coexistence data among user devices that otherwise could not occur.

Communications between the coexistence data provider and the spectrum user devices may be performed via electronic messaging as is conventional. For example, the coexistence data provider may be a cloud-based (e.g., Internet-based) service that implements message-based interfaces (XML format over HTTP) to be used by network devices to submit device coexistence data updates. Furthermore, since the cloud-based service has access to spectrum frequency allocations and availability information, and coexistence data coming from network devices, the coexistence data provider is able to predict congestion based on how many devices are currently assigned to the same spectrum frequency. In this manner, the cloud-based coexistence data provider provides to devices dynamic, proactive spectrum use offers to mitigate low performance due to congestion. Furthermore, devices that are not able to perform their own sensing can request network coexistence reports from the cloud-based coexistence data provider. Accordingly, even when a user device is incapable of performing its own sensing, the network coexistence reports can be used by the user device to help the device determine if and when to request spectrum that may result in better performance.

Figure 4:
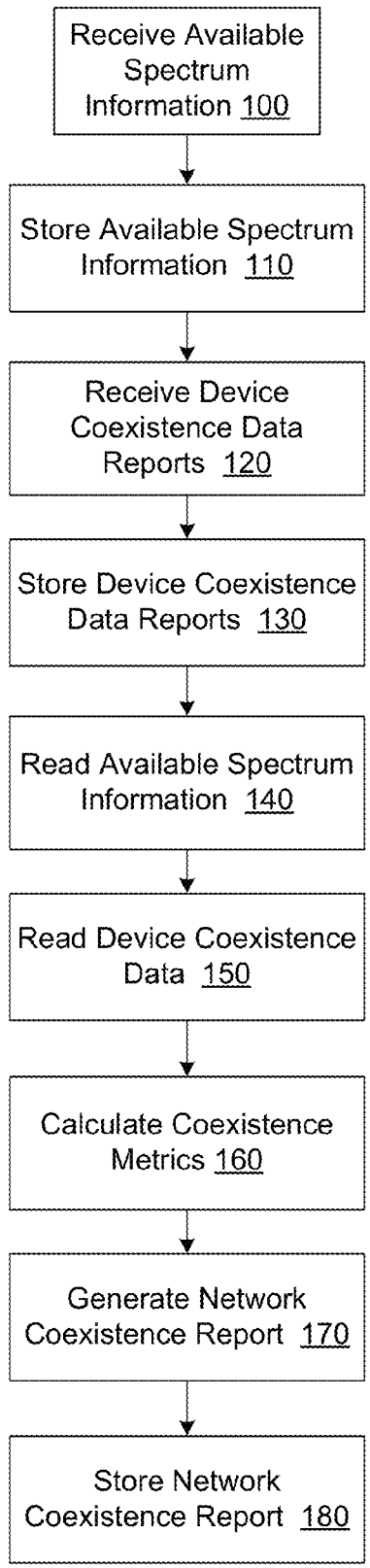
FIG. 4 is a flow chart diagram that depicts an exemplary method of processing coexistence data by a coexistence data provider, and particularly a method of generating a network coexistence report by a coexistence data provider.

In accordance with the above description, FIG. 4 is a flow chart diagram that depicts an exemplary method of processing coexistence data by a coexistence data provider, and particularly a method of generating a network coexistence report by a coexistence data provider, such as the coexistence data provider 50 described above. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 100, in which the coexistence data provider receives available spectrum information. The available spectrum information may include spectrum designated as being available by spectrum providers, as well at allocation information (e.g., time, frequency range, coverage area, and power limits) as to previously allocated spectrum. At step 110, the available spectrum information may be stored in an available spectrum data store. At step 120, the coexistence data provider receives device coexistence data reports from a plurality of spectrum user devices regarding the spectrum usage of the user devices. At step 130, the device coexistence data reports may be stored in a device coexistence data store. The following steps of processing the received and stored information of steps 100-130 may be performed by the controller 52 of the coexistence data provider 50 executing the coexistence data application 54 stored in the memory 56 (see FIG. 3). At steps 140 and 150 respectively, the coexistence data provider reads the available spectrum information and the device coexistence data.

At step 160, the coexistence data provider calculates coexistence metrics based on the available spectrum information and device coexistence data received from the user devices. As described above, the coexistence metrics constitute measures of the current spectrum utilization in the network or networks being monitored. At step 170, the coexistence metrics may be employed by the coexistence data provider to generate a network coexistence report that presents a detailed picture and analysis of such current spectrum utilization in the network or networks being monitored. At step 180, the network coexistence report may be stored in a coexistence report database.

Figure 5:
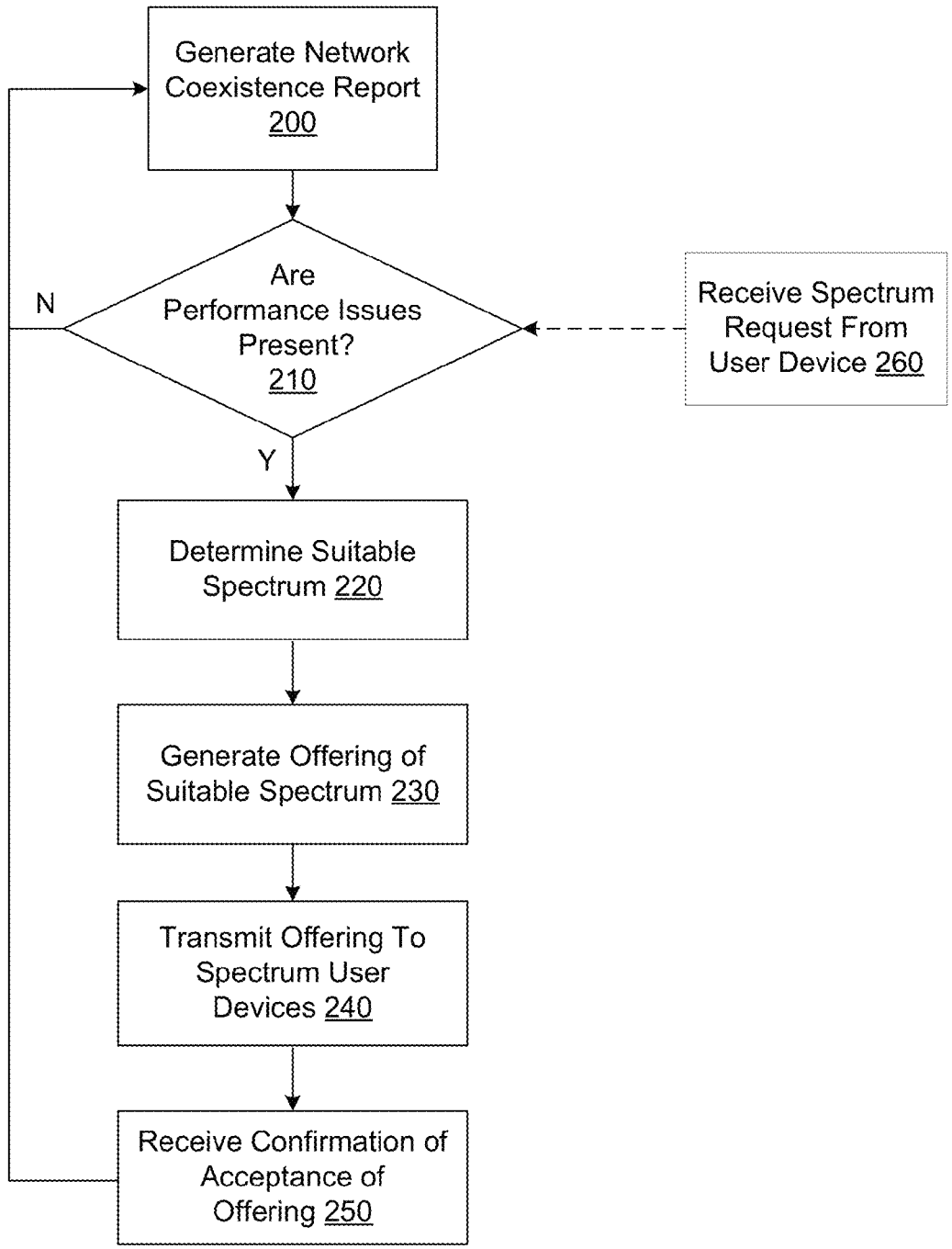
FIG. 5 is a flow chart diagram that depicts an exemplary method of processing coexistence data by a coexistence data provider, and particularly a method of generating an offering of spectrum by a coexistence data provider.

Once the coexistence reports have been generated, they may be employed by the system in a variety of ways. In one embodiment, the coexistence data provider utilizes the coexistence reports to generate offers of spectrum that reduce interference and performance issues of the spectrum user devices. FIG. 5 is a flow chart diagram that depicts an exemplary method of processing coexistence data by a coexistence data provider, and particularly a method of generating an offering of spectrum by a coexistence data provider, such as the coexistence data provider 50 described above, based on a network coexistence report. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 200, at which the coexistence data provider generates a network coexistence report in the manner described above with respect to FIG. 4. As above, the various steps of processing the information generated in the network coexistence data report may be performed by the controller 52 of the coexistence data provider 50 executing the coexistence data application 54 stored in the memory 56 (see FIG. 3). At step 210, the coexistence data provider determines whether performance issues are present based on the coexistence data report, such as identifying devices in the network that are underperforming due to congestion, overuse of spectrum, and resultant interference among user devices by too many devices in the network operating under comparable use parameters. Even when no performance issues are identified, as represented by the return from step 210 (a "No" determination), the coexistence data provider will continuously monitor spectrum availability and user device coexistence data to generate network coexistence reports. In this manner, the coexistence data provider remains proactive in identifying and predicting potential performance issues.

When it is determined at step 210 that performance issues are present, at step 220 the coexistence data provider determines suitable spectrum, or spectrum the use of which would not encounter the determined performance issues. The suitable spectrum, therefore, is allocable spectrum that may be allocated to spectrum user devices to improve the performance of spectrum user devices that are underperforming. Accordingly, at step 230 the coexistence data provider may generate an offering of the suitable spectrum to underperforming spectrum user devices. At step 240, such spectrum offerings may be transmitted to spectrum user devices that have been identified as experiencing performance issues. Such offerings may be transmitted directly from the coexistence data provider to the identified spectrum user devices, or the offerings may be transmitted first to the allocation engine, which may then offer the spectrum to the identified spectrum user devices as part of the other allocation processes of the allocation engine. At step 250, the coexistence data provider may receive a confirmation of acceptance of the offering from a spectrum user device that accepts the spectrum offering. As above, communications with the spectrum user devices and/or the allocation engine may be performed over the coexistence interface 58 of the coexistence data provider (see FIG. 3).

As also referenced above, the processing performed to generate the network coexistence data reports occurs continuously. This is indicated in FIG. 5 by the return from step 250. As such, the coexistence data provider can generate offerings of spectrum in an attempt to drive the reallocation of spectrum so as to overcome deficient performance issues, as well as proactively avoid potential performance issues that may otherwise occur. Under such circumstances, a specific request for spectrum by a spectrum user device is not necessary and thus will not need to be received. As also depicted in FIG. 5, in another exemplary operation the coexistence data provider can generate an offering of spectrum in response to a user request for spectrum having a more suitable performance. For example, at step 260 the coexistence data provider may receive a spectrum use request from a spectrum user device (shown connected with a dashed arrow because a spectrum request will not always be received). In response to the user request, similarly as described above, the coexistence data provider may then determine the existence of any performance issues, determine suitable spectrum, and generate an offering of the suitable spectrum (steps 210-250). Under this exemplary mode of operation, the generated offering of suitable spectrum will also be based on the parameters of the spectrum request generated by the spectrum user device.

In exemplary embodiments, therefore, instead of the coexistence data provider generating offers automatically based on the network coexistence reports, the network coexistence reports may be transmitted to spectrum user devices. The network coexistence reports may be transmitted to spectrum user devices automatically at periodic intervals, or at the request of a spectrum user device. The spectrum user device then may utilize the network coexistence reports to analyze performance issues, and either retune to more suitable spectrum or generate a spectrum use request for more suitable spectrum.

As one aspect over its operation, therefore, a spectrum user device generates device coexistence data reports that are used by the coexistence data provider to generate the broader network coexistence report. Accordingly, a spectrum user device includes a coexistence data generator that generates a device coexistence data report, wherein the device coexistence data report pertains to spectrum usage of the spectrum user device, and a memory for storing the device coexistence data report. The user device also includes a communication interface that transmits the device coexistence data report to a coexistence data provider. The device coexistence data report is combinable with available spectrum information by the coexistence data provider to generate a network coexistence report that is indicative of spectrum usage within one or more wireless communication networks. As described above, the device coexistence data report includes device identifying information and at least one of the spectrum user device's, location, coverage area of any current spectrum usage, current spectrum usage frequency, power spectral density, packet completion rate, duty cycle, or sensing data.

As another aspect of its operation, a spectrum user device may utilize a network coexistence data report to select a more suitable spectrum of operation. Accordingly, a spectrum user device includes an interface that receives a network coexistence report from a coexistence data provider, wherein the network coexistence report is indicative of spectrum usage within one or more wireless communication networks. A controller is configured to execute a spectrum selection application that is stored in a memory and, by execution of the spectrum selection application, the controller is configured to analyze the network coexistence report to determine any performance issues that are associated with current spectrum usage, and identify suitable spectrum that provides enhanced performance. The user device also has a tuner, and the spectrum user device can retune to the identified suitable spectrum.

Figure 6:
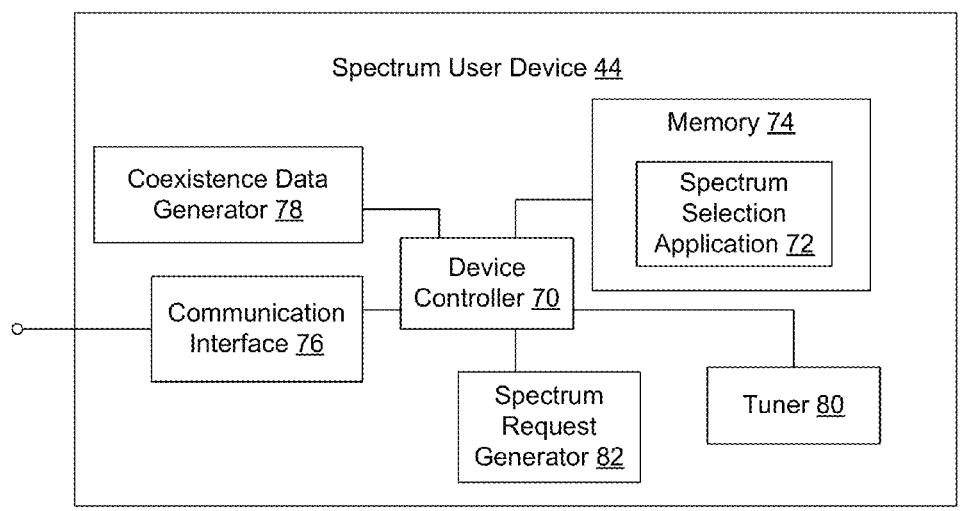
FIG. 6 is a schematic block diagram that depicts operative portions of an exemplary spectrum user device.

To further illustrate the operation of spectrum user devices in utilizing coexistence data, FIG. 6 is a schematic diagram that depicts operative portions of a spectrum user device 44. The spectrum user device 44 may be any wireless communication device that uses spectrum and thus is not limited to any particular type of device. The spectrum user device 44 may include components that also operate as a computer-based system capable of executing computer applications (e.g., software programs). The spectrum user device may include a device controller or control circuit 70 that is configured to execute a spectrum selection application 72. The term "control circuit" or "controller" refers to any structural arrangement that implements a stated control function, and may include dedicated circuit components, firmware, and/or a processor that executes logical instructions. In exemplary embodiments, the spectrum selection application 72 is embodied as one or more computer programs (e.g., one or more software applications including compilations of executable code). The computer program(s) may be stored on a computer or machine readable medium 74, such as a magnetic, optical or electronic storage device (e.g., hard disk, optical disk, flash memory, etc.).

To execute spectrum selection application 72, the controller 70 may include one or more processors used to execute instructions that carry out a specified logic routine(s). The computer readable medium 74, also referred to as a memory 74, may constitute a memory component for storing data, logic routine instructions, computer programs, files, operating system instructions, and the like. The memory 74 may comprise several devices, including volatile and non-volatile memory components. Accordingly, the memory 74 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The controller or control circuit 70 and the components of the memory 74 may be coupled over a local interface, bus, and/or data structure, as is conventional for a computer based system.

The spectrum user device 44 further may include a communication interface 76. The communication interface 76 is configured as an electronic communications interface that is capable of communicating with components of the ASA (see FIG. 2), including the coexistence data provider 50 and the allocation engine 36.

The spectrum user device 44 further includes a coexistence data generator 78. The coexistence data generator 78 generates the device coexistence data reports that are utilized by the coexistence data provider (which receives such device coexistence data from the various devices on the network) to generate the network coexistence reports described in detail above. Such device coexistence data is transmitted to the coexistence data provider via the communication interface 76. Device coexistence data reports also may be stored in the memory 74.

As referenced above, the spectrum user device 44 also may receive the network coexistence reports from the coexistence data provider 50. The network coexistence reports may be received automatically at periodic intervals, or upon request by the spectrum user device. For example, whenever the spectrum user device determines it would be beneficial to receive coexistence data related to the device's current operating location, the device can send a coexistence request message to the coexistence data provider. The request message may be generated as part of the execution of the spectrum selection application 72, and may include parameters to specify the signal threshold, radius, and averaging period for one or more frequency ranges of spectrum usage. The network coexistence reports also may be stored in the memory 74. The device controller 70 further is configured to execute the spectrum selection application 72 to analyze the networks coexistence reports to determine any performance issues that are associated with current spectrum usage. As described above, the network coexistence reports make the receiving user device aware of coexistence data with respect to other user devices within the device's current location and operating radius or coverage area. The receiving user devices can use the network coexistence reports to help make decisions to move to spectrum that may provide better operating performance. For example, the spectrum user device may be underperforming due to poor signal strength, congestion in the network, and/or interfering with other devices on the network or adjacent networks. When such performance issues are determined based on the analysis of the network coexistence reports, as further execution of the spectrum selection application 74, the device controller 72 is configured to identify more suitable spectrum for use by the spectrum user device.

When the spectrum user device is operating within a network of unlicensed spectrum, or otherwise is permitted to operate under different spectrum within the network, the spectrum user device may retune to the identified suitable spectrum. As seen in FIG. 6, the spectrum user device 44 has a tuner 80 by which the user device can retune to the identified suitable spectrum. For example, the spectrum user device may be operating within TV white space, and can retune to an alternative suitable channel within the channel map of available spectrum.

Alternatively, the parameters of usage of the identified suitable spectrum may not permit immediate retuning to the identified suitable spectrum. The spectrum user device 44, therefore, further may include a spectrum request generator 82 that generates a request for spectrum corresponding to the identified suitable spectrum. The spectrum request may be transmitted via the communication interface 76 to the coexistence data provider 50. The coexistence data provider 50 may then generate an offering for the identified suitable spectrum, and the offering may then be transmitted to the spectrum user device 44 and received via the communication interface 78 in response to the request. The controller 70 may then cause the tuner 80 to retune to the spectrum user device to the identified suitable spectrum in response to the receipt of the spectrum offering. The spectrum request generator 82 may also generate a confirmation message, which is then transmitted back the coexistence data provider to confirm receipt of the spectrum offering and retuning of the spectrum user device to the identified suitable spectrum. As referenced above, communication between the spectrum user devices and the coexistence data provider may be direct or through the allocation engine of the ASA.

Figure 7:
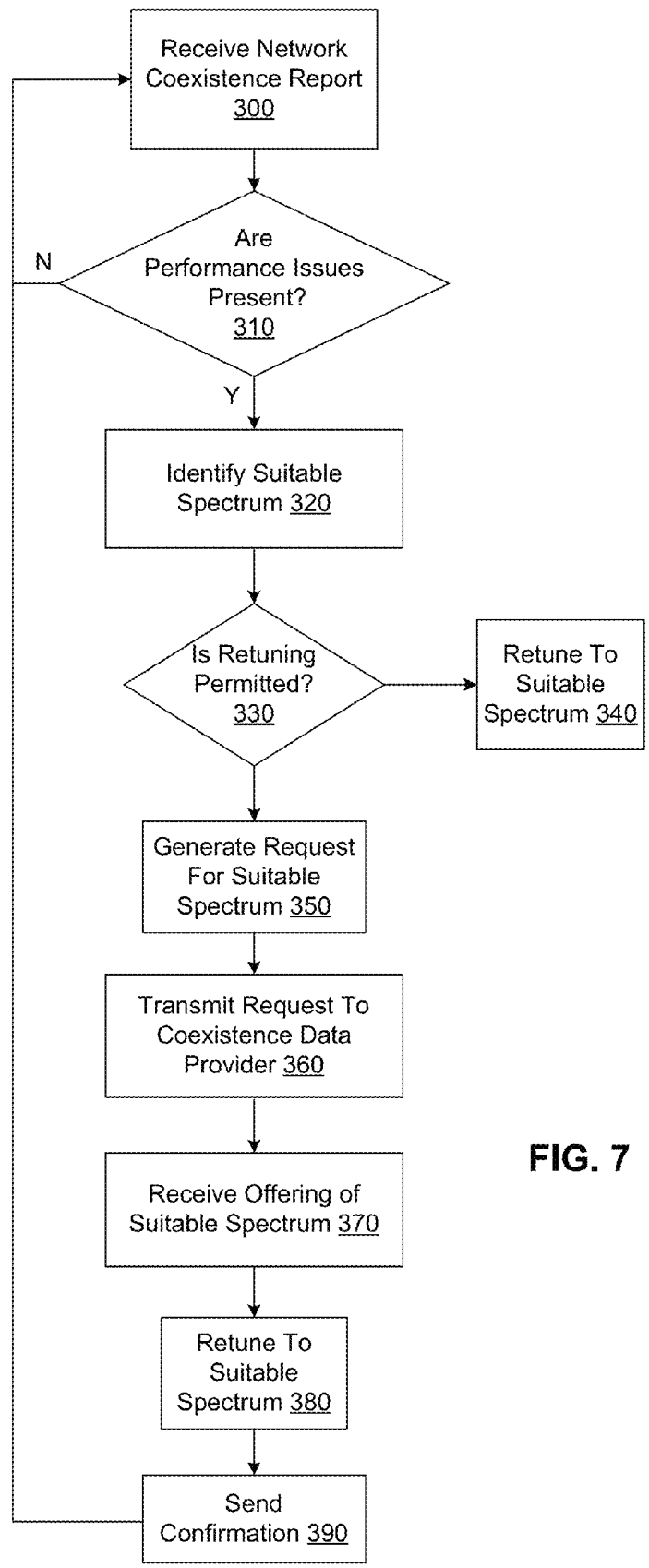
FIG. 7 is a flow chart diagram that depicts an exemplary method of processing coexistence data by a spectrum user device, and particularly a method selecting suitable spectrum based on a network coexistence report.

FIG. 7 is a flow chart diagram that depicts an exemplary method of processing coexistence data by a spectrum user device, and particularly a method of selecting suitable spectrum based on a network coexistence report. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 300, at which the spectrum user device receives a network coexistence report from a coexistence data provider. The various steps of processing the information contained in the network coexistence data reports may be performed by the device controller 70 of the spectrum user device 44 executing the spectrum selection application 72 stored in the memory 74 (see FIG. 6). At step 310, the spectrum user device determines whether performance issues are present based on the network coexistence report, such as identifying whether the spectrum user device is underperforming due to congestion, overuse of spectrum, and resultant interference with other user devices by too many devices in the network operating under comparable use parameters. Even when no performance issues are identified, as represented by the return from step 310 (a "No" determination), the spectrum user device may continuously or periodically receive network coexistence reports (either automatically or upon request) to monitor performance issues.

When it is determined at step 310 that performance issues are present, at step 320 the spectrum user device identifies suitable spectrum, or spectrum the use of which would not encounter the determined performance issues. At step 330, it is determined whether it is permitted under the usage parameters of the identified suitable spectrum to retune to the identified suitable spectrum. If so, at step 340, the spectrum user device may retune to the identified suitable spectrum. If the usage parameters do not permit immediate retuning to the identified suitable spectrum, at step 350 the spectrum user device may generate a request for the suitable spectrum. At step 360, such spectrum request may be transmitted to the coexistence data provider, either directly or through the allocation engine of the ASA. At 370, the spectrum user device may receive an offering of suitable spectrum from the ASA (such as from the coexistence data provider and/or via the allocation engine), and at step 380 the spectrum user device may retune to the identified suitable spectrum in response to the offering. At step 390, the spectrum user device may send a confirmation of acceptance of the offering to the coexistence data provider and/or allocation engine of the ASA. As above, communications between the spectrum user devices and components of the ASA may be performed over the communication interface 78 of the spectrum user device 44 (see FIG. 5).

Similarly as to the operation of the coexistence data provider in generating the network coexistence data reports continuously, the spectrum user devices similarly may receive the coexistence reports on essentially a continuous basis or automatically at periodic intervals. This is indicated in FIG. 7 by the return from step 390. As such, spectrum user devices can utilize the coexistence data reports to continuously monitor spectrum usage across the networks being monitored. In this manner, spectrum user devices can seek out spectrum so as to overcome deficient performance issues as they occur, as well as proactively avoid potential performance issues.

The systems, devices, and methods described herein provide enhanced spectrum allocation as compared to conventional configurations. Non-sensing spectrum user devices cannot sense spectrum usage parameters of other devices, and therefore have no basis for identifying suitable spectrum when performance deterioration occurs. In the described system, however, non-sensing user devices can receive and analyze the network coexistence reports, from which the user devices can then identify more suitable spectrum. Even devices with a sensing capability have limited capacity to gather sensing data as compared to the device coexistence data that can be gathered across one or more networks by the described coexistence data provider. Because the coexistence data provider receives coexistence data from the multitude of spectrum user devices, much of the information contained in the network coexistence reports is beyond the reach or sensing capacity of conventional sensing user devices. Furthermore, the device coexistence data is combined in a standardized format, which results in the sharing of coexistence data among dissimilar devices. In other words, as to both non-sensing and sensing user devices, the network coexistence reports essentially provide sensing data that otherwise would not be available. As a result, more suitable spectrum can be identified in a dynamic, real time basis, which in turn provides for a more effective allocation of spectrum usage.

Figure 8:
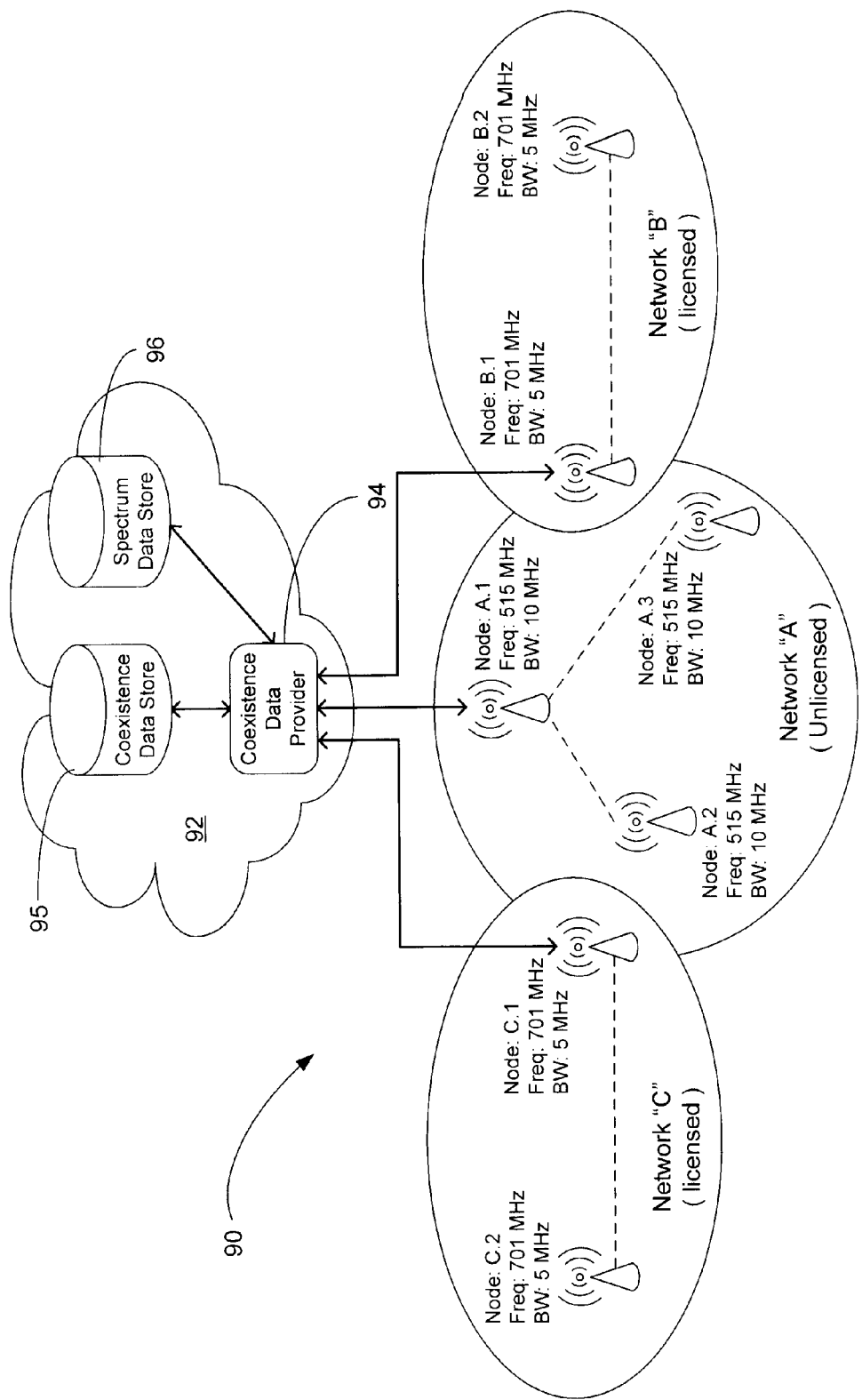
FIG. 8 is a schematic diagram that depicts an exemplary system for sharing coexistence data across multiple networks.

Because the coexistence data provider can receive device coexistence data across multiple networks, such data in turn can be shared in the network coexistence reports transmitted in multiple networks. FIG. 8 is a schematic diagram that depicts an exemplary system 90 for sharing coexistence data in network coexistence reports across multiple networks. In the example of FIG. 8, there are three Networks A, B, and C. Network A represents a network of unlicensed spectrum that includes nodes A.1, A.2, and A.3 representing spectrum user devices. Network B, represents a network of licensed spectrum that includes nodes B.1 and B.2 representing spectrum user devices, and Network C, represents another network of licensed spectrum that includes nodes C.1 and C.2 representing spectrum user devices. FIG. 8 also indicates the frequency of operation and bandwidth of each of the nodes, which forms part of the device coexistence data provided from the spectrum user devices to the coexistence data provider. It will be appreciated that the configuration of the networks in FIG. 8 represent one example, and similar principles are applicable to any spectrum usage network configuration.

As seen in FIG. 8, the system 90 may include a coexistence data network 92 that includes a coexistence data provider 94, a coexistence data store 95, and a spectrum data store 96. As one communication sharing, each of the node devices in FIG. 8 transmits device coexistence data to the coexistence data provider 94, and the device coexistence data is stored in the coexistence data store 95. In this manner, the coexistence data store combines the device coexistence data of numerous devices across multiple networks. In addition, the coexistence data provider 94 can access available spectrum information from the spectrum data store 96, the available spectrum information, for example, being provided by an allocation engine of an ASA that may allocate spectrum across the multiple Networks A, B, and C.

As another communication sharing, the coexistence data provider 94 can provide network coexistence reports to the node devices within the Networks A, B, and C. It will be appreciated that because the device coexistence data and the available spectrum information pertain to spectrum usage across the Networks A, B, and C, the network coexistence reports in turn also will pertain to spectrum usage, including any performance issues, across Networks A, B, and C. Accordingly, suitable spectrum can be identified in a manner that accounts for performances issues both as among devices within a given network, as well as performance issues that may occur as between devices on adjacent or nearby networks. In this manner, a more efficient allocation of spectrum across the multiple networks is attained.

Although certain embodiments have been shown and described, it is understood that equivalents and modifications falling within the scope of the appended claims will occur to others who are skilled in the art upon the reading and understanding of this specification.

What is claimed is:

1. A coexistence data provider in a system for allocating spectrum to spectrum user devices within one or more wireless communication networks, the coexistence data provider comprising:
an interface configured to receive inputs of available spectrum information, and to receive a plurality of device coexistence data reports from a respective plurality of spectrum user devices, wherein the plurality of device coexistence data reports pertain to spectrum usage of the respective plurality of spectrum user devices;
a controller configured to execute a coexistence data application that is stored in a memory and, by execution of the coexistence data application, the coexistence data provider is configured to combine the available spectrum information and the device coexistence data reports to generate a network coexistence report that is indicative of spectrum usage within the one or more networks; and
a database that stores the network coexistence report;
wherein by the controller execution of the coexistence data application, the coexistence data provider is configured to generate a plurality of coexistence metrics that constitute measures of performance efficiency of the spectrum user devices, and the network coexistence report includes the coexistence metrics.

2. The coexistence data provider of claim 1, further comprising a data store that stores the available spectrum information.

3. The coexistence data provider of claim 1, further comprising a data store that stores the device coexistence data reports.

4. The coexistence data provider of claim 1, wherein the coexistence metrics include a moving average of packet complete rate values for the spectrum being utilized by the spectrum user devices.

5. A coexistence data provider in a system for allocating spectrum to spectrum user devices within one or more wireless communication networks, the coexistence data provider comprising:
an interface configured to receive inputs of available spectrum information, and to receive a plurality of device coexistence data reports from a respective plurality of spectrum user devices, wherein the plurality of device coexistence data reports pertain to spectrum usage of the respective plurality of spectrum user devices;
a controller configured to execute a coexistence data application that is stored in a memory and, by execution of the coexistence data application, the coexistence data provider is configured to combine the available spectrum information and the device coexistence data reports to generate a network coexistence report that is indicative of spectrum usage within the one or more networks; and
a database that stores the network coexistence report;
wherein by the controller execution of the coexistence data application, the coexistence data provider is configured to:
identify performance issues that are indicative of underperformance of at least one of the spectrum user devices;
determine suitable spectrum that provides enhanced performance for the at least one of the spectrum user devices; and
incorporate the determined suitable spectrum into the network coexistence report.

6. The coexistence data provider of claim 5, wherein by the controller execution of the coexistence data application, the coexistence data provider is configured to:
generate a spectrum offering of the determined suitable spectrum; and
transmit the offering of the determined suitable spectrum via the interface to the at least one of the spectrum user devices.

7. The coexistence data provider of claim 6, wherein the coexistence data provider receives a confirmation of acceptance of the spectrum offering via the interface from the at least one of the spectrum user device.

8. The coexistence data provider of claim 5, wherein the coexistence data provider transmits the network coexistence report via the coexistence interface to the at least one of the spectrum user devices.

9. The coexistence data provider of claim 1, wherein the coexistence data provider transmits the network coexistence report via the coexistence interface to the plurality of the spectrum user devices.

10. A method of processing coexistence data by a coexistence data provider comprising the steps of:
receiving available spectrum information over an interface;
receiving device coexistence data reports from a plurality of spectrum user devices regarding the spectrum usage of the plurality of spectrum user devices;
executing a spectrum provisioning application that is stored in a memory and, by executing the spectrum provisioning application, combining the available spectrum information and the device coexistence data reports to generate a network coexistence report that is indicative of spectrum usage within one or more wireless communication networks;
storing the network coexistence report in a database; and
executing the coexistence data application to generate a plurality of coexistence metrics that constitute measures of performance efficiency of the spectrum user devices, and the network coexistence report includes the coexistence metrics.

11. The method of processing coexistence data of claim 10, further comprising storing the available spectrum information in a data store.

12. The method of processing coexistence data of claim 10, further comprising storing the device coexistence data reports in a data store.

13. The method of processing coexistence data of claim 10, wherein the coexistence metrics include a moving average of packet complete rate values for the spectrum being utilized by the spectrum user devices.

14. A method of processing coexistence data by a coexistence data provider comprising the steps of:
receiving available spectrum information over an interface;
receiving device coexistence data reports from a plurality of spectrum user devices regarding the spectrum usage of the plurality of spectrum user devices;
executing a spectrum provisioning application that is stored in a memory and, by executing the spectrum provisioning application, combining the available spectrum information and the device coexistence data reports to generate a network coexistence report that is indicative of spectrum usage within one or more wireless communication networks;
storing the network coexistence report in a database; and
further comprising executing the coexistence data application to perform the steps of:

identifying performance issues that are indicative of under-performance of at least one of the spectrum user devices;

determining suitable spectrum that provides enhanced performance for the at least one of the spectrum user devices; and incorporating the determined suitable spectrum into the network coexistence report.

15. The method of processing coexistence data of claim 14, further comprising executing the coexistence data application to perform the steps of:

generating a spectrum offering of the determined suitable spectrum; and transmitting the offering of the determined suitable spectrum via the interface to the at least one of the spectrum user devices.

16. The method of processing coexistence data of claim 15, further comprising receiving a confirmation of acceptance of the spectrum offering via the interface from the at least one of the spectrum user devices.

17. The method of processing coexistence data of claim 14, further comprising transmitting the network coexistence report via the coexistence interface to the at least one of the spectrum user devices.

18. The method of processing coexistence data of claim 10, further comprising transmitting the network coexistence report via the interface to the plurality of the spectrum user devices.

* * * * *